(12) United States Patent
Crane et al.

(10) Patent No.: US 11,046,172 B2
(45) Date of Patent: Jun. 29, 2021

(54) VEHICLE COMPARTMENT LOUVER CARRIER WITH INTEGRATED DUCTING

(71) Applicant: MAGNA INTERNATIONAL INC., Aurora (CA)

(72) Inventors: Michael W. Crane, Rochester, MI (US); Thomas Pilette, Lake Orion, MI (US); Norman Guschewski, Rochester Hills, MI (US)

(73) Assignee: MAGNA INTERNATIONAL INC, Concord (CA)

( * ) Notice: Subject to any disclaimer, the term of this patent is extended or adjusted under 35 U.S.C. 154(b) by 716 days.

(21) Appl. No.: 15/410,136

(22) Filed: Jan. 19, 2017

(65) Prior Publication Data

US 2017/0129326 A1    May 11, 2017

Related U.S. Application Data

(63) Continuation of application No. 13/261,147, filed as application No. PCT/CA2010/001149 on Jul. 21, 2010, now Pat. No. 9,586,625.
(Continued)

(51) Int. Cl.
*B60K 11/08* (2006.01)
*B29C 48/00* (2019.01)
(Continued)

(52) U.S. Cl.
CPC ........ *B60K 11/085* (2013.01); *B29C 48/0021* (2019.02); *B29C 48/0022* (2019.02);
(Continued)

(58) Field of Classification Search
CPC ...... B60K 11/085; B60K 11/04; F24F 13/082; F24F 13/084; B62D 25/085
See application file for complete search history.

(56) References Cited

U.S. PATENT DOCUMENTS 1,471,510 A * 10/1923 Willis .................. B60K 11/085
                                                     123/41.05
1,523,541 A *  1/1925 Irving ................. B60K 11/085
                                                       236/35.3
(Continued)

FOREIGN PATENT DOCUMENTS

DE       31 45 414 A1    6/1982
DE  20 2005 010683 U1    9/2005
(Continued)

OTHER PUBLICATIONS

Lucbernet, et al, EP 0925983 A1 English machine translation, Jun. 30, 1999 (Year: 1999).*
(Continued)

*Primary Examiner* — Kenneth J Hansen
*Assistant Examiner* — Phillip Decker
(74) *Attorney, Agent, or Firm* — Warn Partners, P.C.

(57) ABSTRACT

The present invention is directed to a carrier for an automobile with integrated active ducting. The carrier includes at least one aperture, and at least one louver rotatably mounted in the aperture. Also attached to the carrier is an actuator, and the actuator is connected to the louver. The actuator is operable for moving the louver between an open position and a closed position such that when the louver is in the open position, air flow passes through the aperture.

9 Claims, 15 Drawing Sheets

Related U.S. Application Data

(60) Provisional application No. 61/271,413, filed on Jul. 21, 2009.

(51) Int. Cl.
| | | |
|---|---|---|
| *B29C 48/151* | (2019.01) | |
| *B60R 19/52* | (2006.01) | |
| *F24F 13/15* | (2006.01) | |
| *B62D 25/08* | (2006.01) | |
| *B60R 19/18* | (2006.01) | |
| *B29K 23/00* | (2006.01) | |
| *B29L 22/00* | (2006.01) | |
| *B29L 31/00* | (2006.01) | |
| *B60K 11/04* | (2006.01) | |

(52) U.S. Cl.
CPC ............ *B29C 48/151* (2019.02); *B60R 19/52* (2013.01); *B62D 25/084* (2013.01); *B62D 25/085* (2013.01); *F24F 13/15* (2013.01); *B29K 2023/12* (2013.01); *B29L 2022/00* (2013.01); *B29L 2031/748* (2013.01); *B60K 11/04* (2013.01); *B60R 2019/1886* (2013.01); *B60R 2019/525* (2013.01); *Y02T 10/88* (2013.01)

(56) References Cited

U.S. PATENT DOCUMENTS

| | | | |
|---|---|---|---|
| 1,619,621 A * | 3/1927 | Lovejoy | B60K 11/085 165/98 |
| 2,174,358 A | 9/1939 | Blumenthal | |
| 2,310,086 A | 2/1943 | Howard | |
| 2,877,517 A | 3/1959 | Graham | |
| 3,077,958 A | 2/1963 | Grimsey | |
| 3,115,223 A * | 12/1963 | Shustrom | F01P 7/10 49/2 |
| 3,136,054 A | 6/1964 | Palmer et al. | |
| 3,447,443 A | 6/1969 | Silvey | |
| 3,468,080 A | 9/1969 | Hansen | |
| 3,783,768 A | 1/1974 | Caming et al. | |
| 4,020,752 A | 5/1977 | Stephan | |
| 4,087,898 A | 5/1978 | Linne | |
| 4,382,460 A | 5/1983 | Ben-Tal | |
| 4,440,212 A | 4/1984 | Tanino et al. | |
| 4,503,755 A | 3/1985 | Nordquist et al. | |
| 4,753,288 A | 6/1988 | Harvey | |
| 4,969,799 A | 11/1990 | Usui et al. | |
| 5,141,026 A * | 8/1992 | Collette | B60K 11/085 137/601.09 |
| 5,425,673 A | 6/1995 | Mahlanen et al. | |
| 5,499,947 A | 3/1996 | Tauber | |
| 5,732,507 A | 3/1998 | Edwards | |
| 5,842,919 A * | 12/1998 | Lyons | F24F 13/15 454/336 |
| 5,927,339 A | 7/1999 | Ellis et al. | |
| 6,135,418 A | 10/2000 | Hatton | |
| 6,209,850 B1 | 4/2001 | Rafalski | |
| 6,250,012 B1 | 6/2001 | Ricci | |
| 6,370,773 B1 | 4/2002 | Ellis et al. | |
| 6,374,545 B1 | 4/2002 | Baczuk | |
| 6,412,755 B2 | 7/2002 | Ito | |
| 6,523,805 B2 | 2/2003 | Kato et al. | |
| 6,854,544 B2 | 2/2005 | Vide | |
| 6,872,348 B2 | 3/2005 | Yasuno et al. | |
| 7,025,159 B2 | 4/2006 | Smith et al. | |
| 7,111,660 B2 | 9/2006 | Hartmann | |
| 7,198,062 B2 | 4/2007 | Hoffman et al. | |
| 7,290,630 B2 | 11/2007 | Maeda et al. | |
| 7,866,737 B2 * | 1/2011 | Browne | F24F 13/1426 296/193.1 |
| 8,043,148 B2 | 10/2011 | Eguchi et al. | |
| 8,161,919 B2 * | 4/2012 | Klotz | B60K 11/085 123/41.04 |
| 8,752,886 B2 * | 6/2014 | Wirth | B60K 11/085 180/68.6 |
| 8,887,846 B2 * | 11/2014 | Yoo | B60K 11/085 180/68.1 |
| 9,370,995 B2 | 6/2016 | Jeong | |
| 9,586,625 B2 | 3/2017 | Crane et al. | |
| 2005/0056822 A1 | 3/2005 | Linford et al. | |
| 2007/0056229 A1 | 3/2007 | Lu | |
| 2008/0133090 A1 | 6/2008 | Browne et al. | |
| 2009/0077894 A1 | 3/2009 | King et al. | |
| 2010/0243352 A1 * | 9/2010 | Watanabe | B60K 11/085 180/68.1 |
| 2011/0005851 A1 | 1/2011 | Doroghazi et al. | |
| 2011/0078955 A1 | 4/2011 | Huang | |
| 2012/0019025 A1 * | 1/2012 | Evans | B62D 35/005 296/193.1 |
| 2012/0079771 A1 | 4/2012 | Meulemans | |
| 2012/0118656 A1 | 5/2012 | Roddy et al. | |
| 2013/0223980 A1 * | 8/2013 | Pastrick | F01D 5/00 415/1 |

FOREIGN PATENT DOCUMENTS

| | | | | |
|---|---|---|---|---|
| DE | 102004026419 A1 * | 12/2005 | ........... | B60K 11/085 |
| EP | 0 925 983 A1 | 6/1999 | | |
| EP | 1114743 A1 | 7/2001 | | |
| EP | 1 728 667 A2 | 12/2006 | | |
| GB | 236309 A * | 7/1925 | ............... | F01P 7/10 |
| GB | 1 153 361 A | 5/1969 | | |
| GB | 2194329 A * | 3/1988 | ........... | F24F 13/075 |
| JP | 09068344 A | 3/1997 | | |
| WO | 2007130847 A2 | 11/2007 | | |
| WO | 2008090781 A1 | 7/2008 | | |
| WO | 2011009212 A1 | 1/2011 | | |

OTHER PUBLICATIONS

International Search Report a for Application No. PCT/CA2010/001149 Filed Nov. 18, 2010.

European Patent Office; European Search Report (for corresponding EP application); dated Jul. 18, 2013.

* cited by examiner

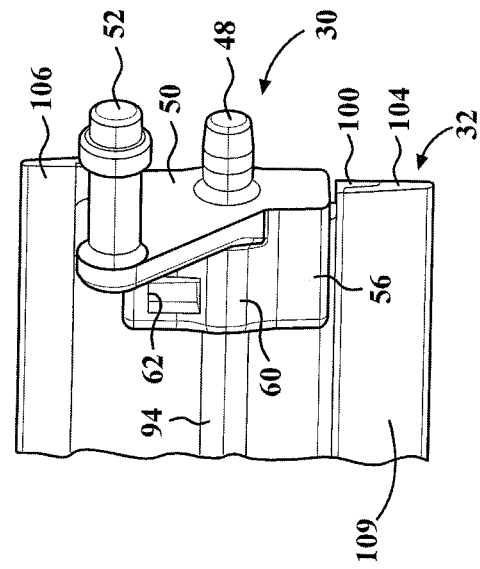
FIG. 9
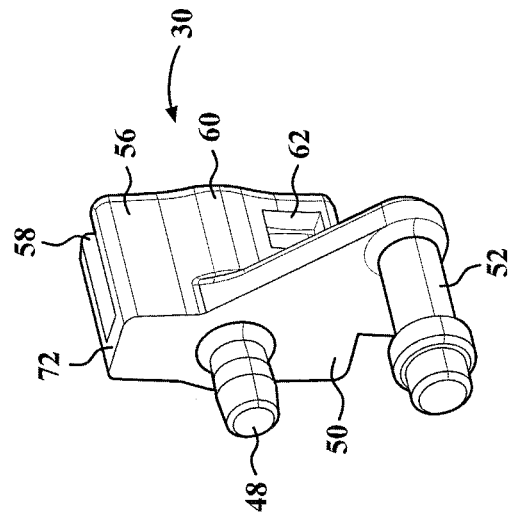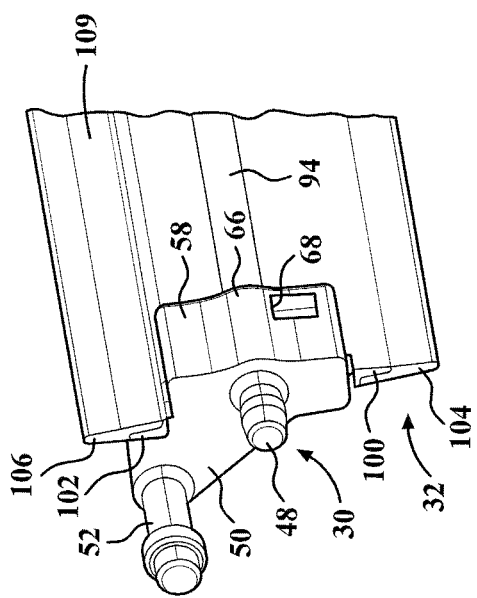
FIG. 10
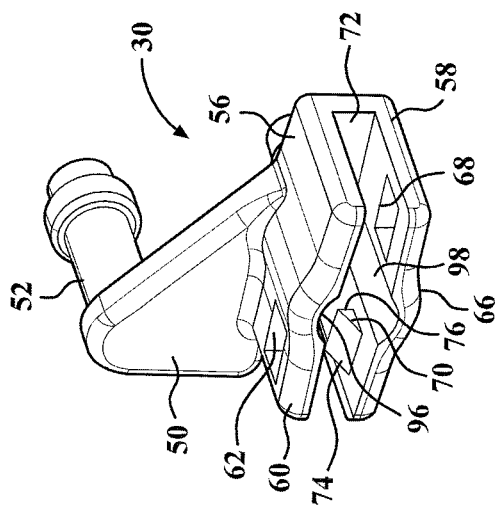
FIG. 11
FIG. 12

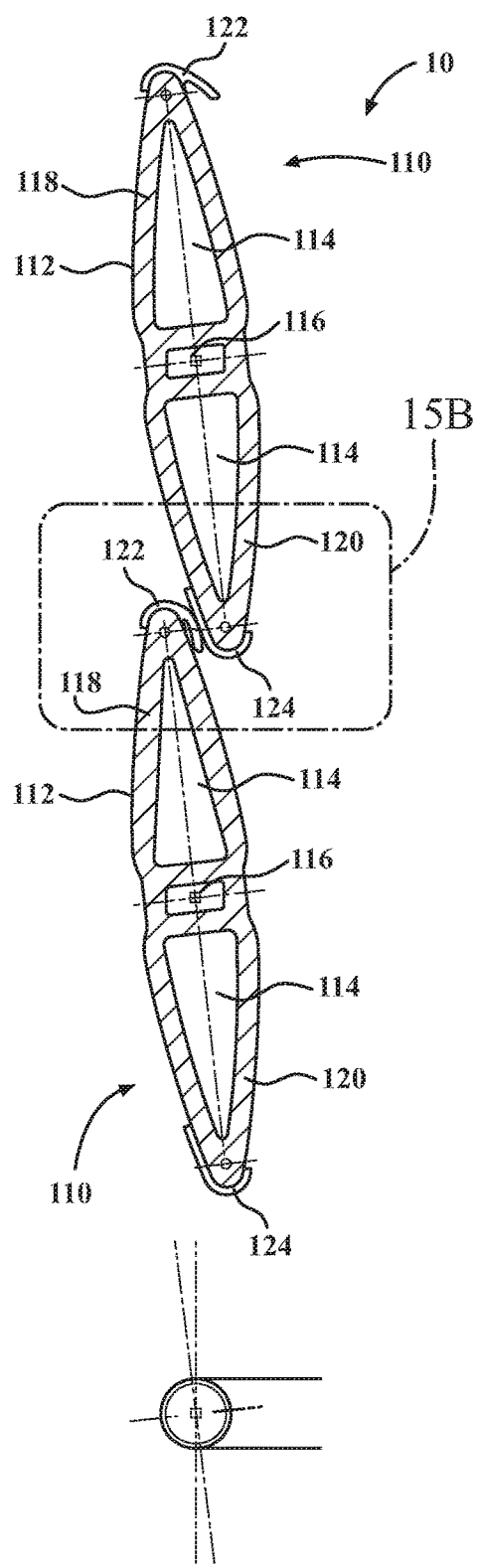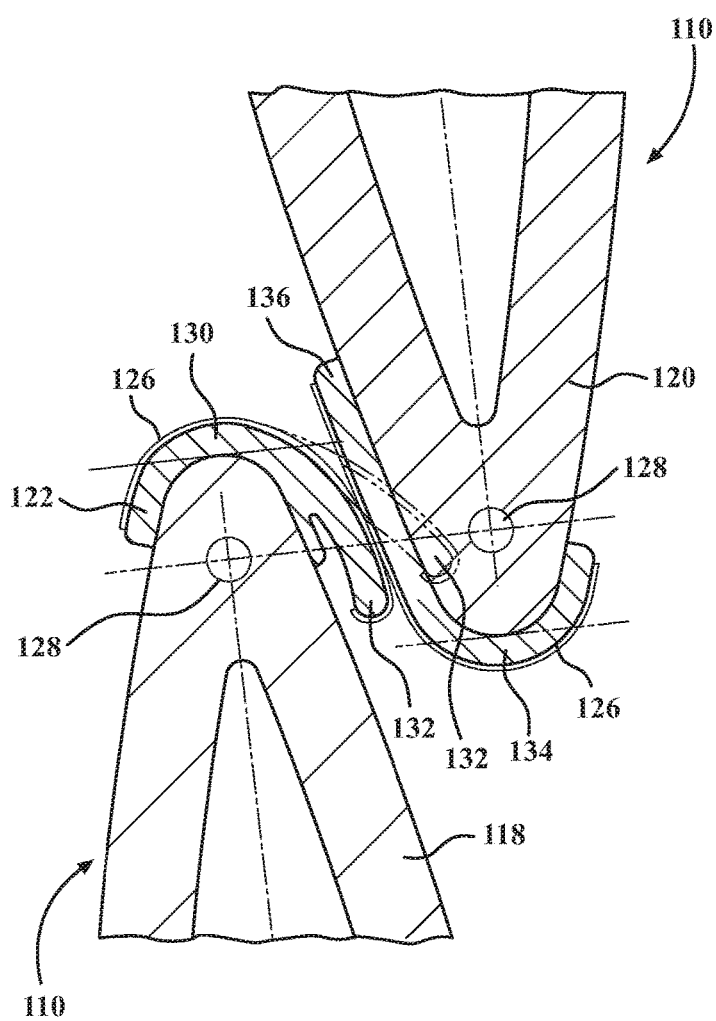
FIG. 15A
FIG. 15B

VEHICLE COMPARTMENT LOUVER CARRIER WITH INTEGRATED DUCTING

CROSS-REFERENCE TO RELATED APPLICATIONS

This application is a Continuation of U.S. application Ser. No. 13/261,147 filed Jan. 19, 2012 which is a National Stage of International Application No. PCT/CA2010/001149National, filed Jul. 21, 2010. This application claims priority to Provisional Patent Application No. 61/271,413 filed on Jul. 21, 2009. The disclosure(s) of the above application(s) is (are) incorporated herein by reference.

FIELD OF THE INVENTION

The present invention relates to a carrier for an automobile which has active ducting integrated with the carrier to provide greater control over the cooling of an automobile.

BACKGROUND OF THE INVENTION

Various attempts have been made to optimize the cooling of various automobile parts. Some of the various devices developed have been designed to control the air flow throughout the engine compartment of the automobile such that the desired amount of heat is transferred away from the engine, transmission, and other components which generate heat in order to maintain an optimal operating temperature.

However, it is also desirable to bring the engine up to the normal operating temperature as soon as possible after engine start-up. When the engine is substantially the same temperature as the surrounding environment and is turned on, the engine is the least fuel efficient (especially during start-up and the temperature of the surrounding environment is cold). The reduced fuel efficiency is why it is considered desirable to bring the engine up to the optimal operating temperature very quickly. Under these conditions, it is not desirable to remove heat away from the engine and the various components surrounding the engine, and therefore devices designed to control air flow around the engine are more beneficially used if they do not remove heat away from the engine at start-up.

Furthermore, components designed to provide optimal cooling when the vehicle is new may operate differently after the vehicle has accumulated significant mileage. This may occur due to various weather conditions, changes in the way the vehicle is operated in response to different drivers, or wear and tear on the vehicle components and other components. All of these factors may affect or change the operation of the components over time as the vehicle accumulates mileage. Also, with many current cooling systems, the airflow generated from the forward motion of a vehicle is not efficiently used to cool the various components of the vehicle. Rather, many of the components of a vehicle cause poor airflow which leads to aerodynamic inefficiencies.

Many of the components designed to control the air flow around an engine for controlling the operating temperature are manufactured as separate components and assembled to the vehicle during the manufacturing process. This increases the number of parts used to assemble the vehicle, complexity of manufacturing, and manufacturing costs.

Accordingly, there exists a need for a cooling system which is operable to have greater control over the airflow around an engine which is adaptable to be suited for use with many different vehicles, and is able to be integrated into one or more pre-existing vehicle components to reduce the number of overall parts used in manufacturing the vehicle.

SUMMARY OF THE INVENTION

The present invention is directed to an integrated active ducting for an automobile. The active ducting includes at least one aperture formed as part of a vehicle component, such as a carrier, and at least one louver rotatably mounted in the aperture. Also attached to the carrier is an actuator, and the actuator is connected to the louver. The actuator is operable for moving the louver between an open position and a closed position such that when the louver is in the open position, air flow passes through the aperture.

The carrier and ducting are integrated together as a single unit and are therefore assembled to the vehicle as a single unit during manufacturing. In an alternate embodiment, the ducting is integrated to a fan shroud, radiator housing, or the like.

More particularly, each louver has a pair of seals, with one seal from one louver contacting a corresponding seal of a corresponding louver for preventing airflow through the aperture of the carrier. Each seal includes a slip coat for reducing the friction between the seals, as well as limiting binding between the louvers from ice formation on the surface of the seals, and improving wear resistance to dirt and debris during cycling.

In another aspect of the present invention, a process for manufacture of a louver used in a louver system is provided. According to this process, as an extended length of a louver is extruded, the louver is extruded into pre-determined shaped cross-sections with dual durometer co-extrusion slip coats and also strengthening cores or wires. This provides a cost effective louver blank that can be cut to any desired length as required for particular applications.

The louver blank is then cut to length using the construction of the present invention. Connection features are formed on the ends which are adapted for connecting to a link mechanism. In a preferred embodiment, the connection features are die cut while cutting the louvers, or after the louvers are cut to a final length.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is a perspective view of a connecting portion attached to a louver used as part of active integrated ducting, according to the present invention;

FIG. 10 a second perspective view of a connecting portion attached to a louver used as part of active integrated ducting, according to the present invention;

FIG. 11 is a first perspective view of a connecting portion operable for attachment to a louver used as part of active integrated ducting, according to the present invention;

FIG. 12 is a second perspective view of a connecting portion operable for attachment to a louver used as part of active integrated ducting, according to the present invention;

FIG. 15A is a sectional side view of an alternate embodiment of louvers used as part of active integrated ducting, according to the present invention;

FIG. 15B is an enlarged view of the circled portion of FIG. 15A;

DETAILED DESCRIPTION OF THE PREFERRED EMBODIMENTS

The following description of the preferred embodiment(s) is merely exemplary in nature and is in no way intended to limit the invention, its application, or uses.

An embodiment of a carrier having integrated active ducting is shown in the Figures generally at 10. The carrier 10 is a single molded component, and includes various ports, flanges, support members, and the like operable for connection with the various components located inside an engine compartment, such as a radiator, fan shroud, washer fluid container, the vehicle chassis, body-in-white (BIW), and other similar components. While the carrier 10 is molded as shown, it is within the scope of the invention that the carrier 10 is operable to be molded having other shapes such that the carrier 10 of the present invention is able to be used with different types of vehicles.

The carrier 10 includes several apertures 12 which function as ducting and are operable for allowing air flow therethrough. The ducting also includes a set of louvers 14 mounted within each of the apertures 12. The louvers 14 are operable to be in a first or open position to allow airflow through the apertures 12, or in a second or closed position to prevent airflow through the apertures 12, or any position therebetween.

Figure 1:
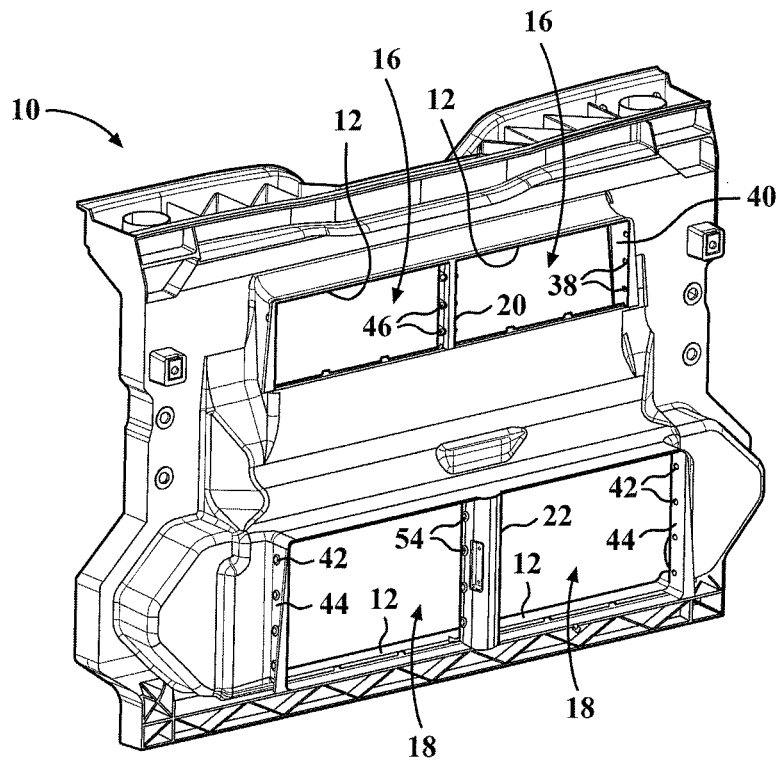
FIG. 1 is a first front perspective view of a carrier having integrated active ducting, according to the present invention.
Figure 2:
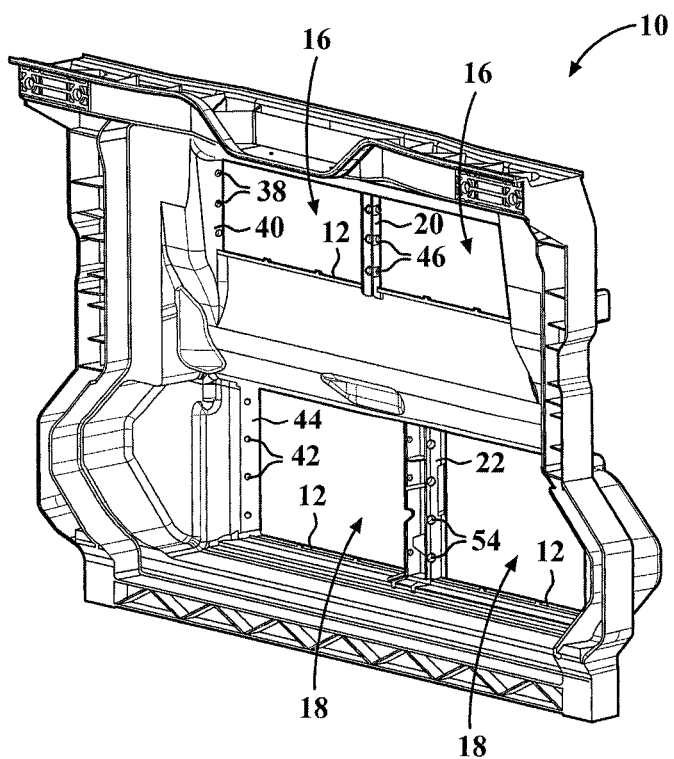
FIG. 2 is a first rear perspective view of a carrier having integrated active ducting, according to the present invention.
Figure 3:
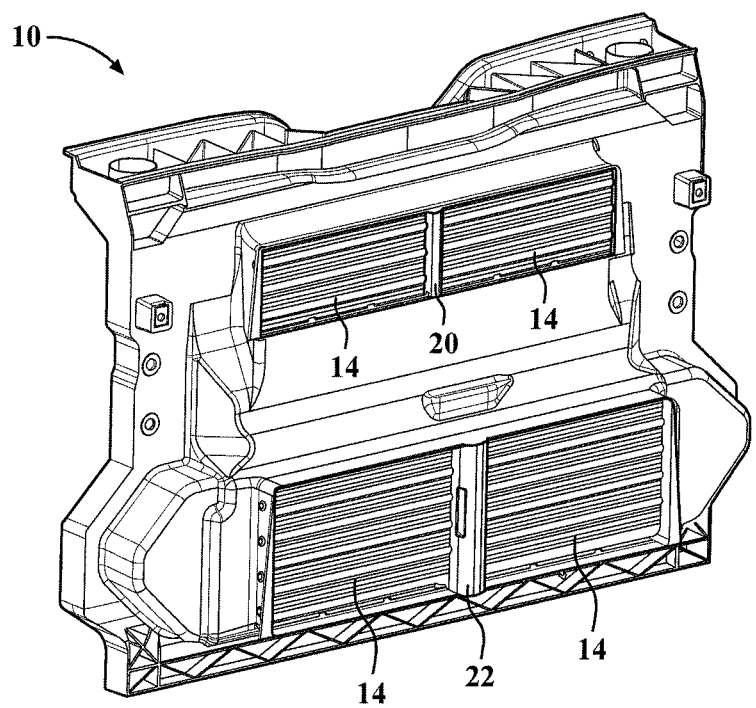
FIG. 3 a second front perspective view of a carrier having integrated active ducting, according to the present invention.
Figure 4:
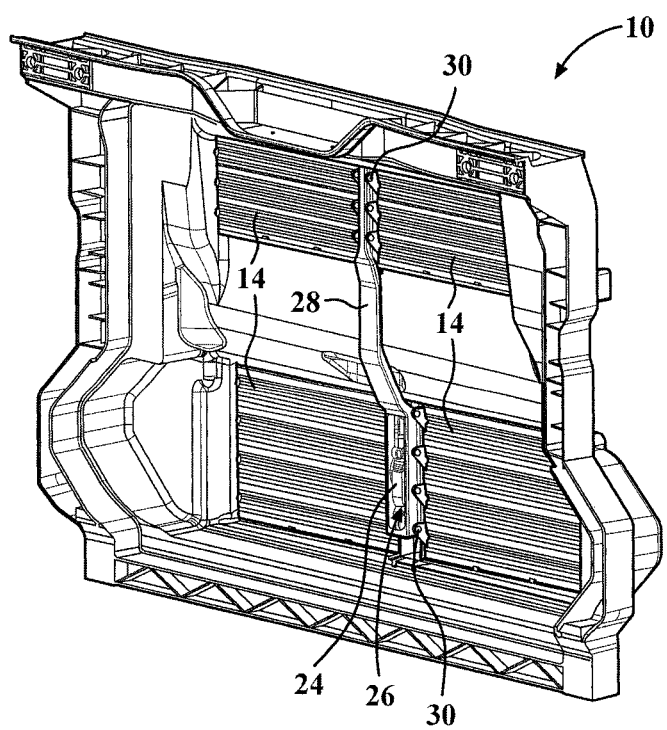
FIG. 4 a second rear perspective view of a carrier having integrated active ducting, according to the present invention.
Figure 5:
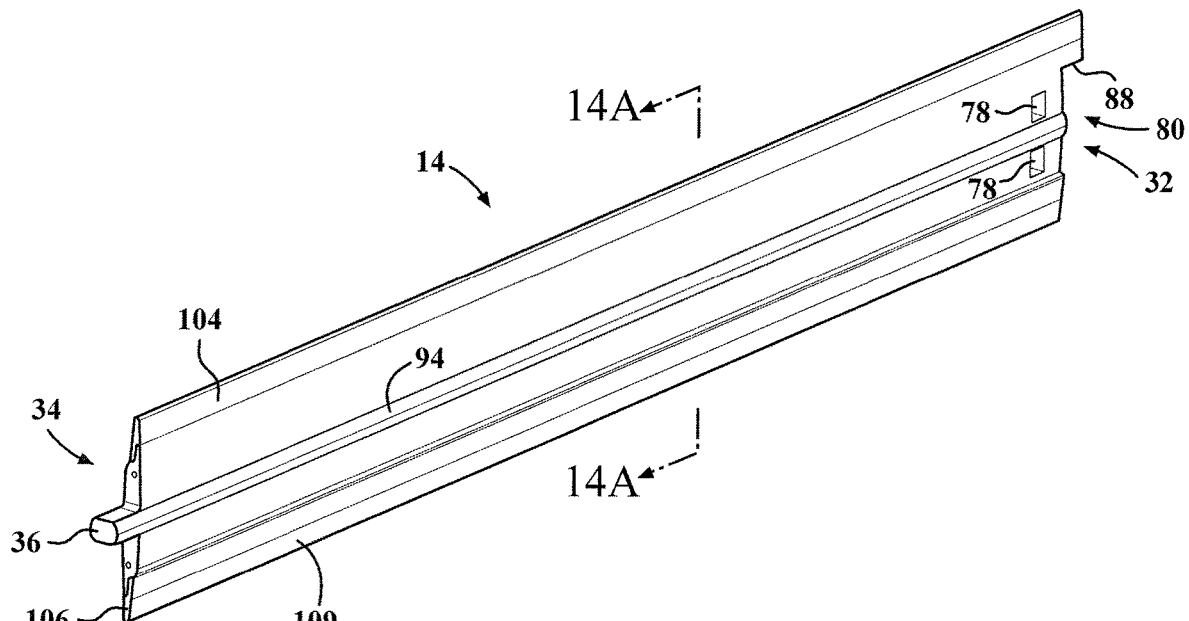
FIG. 5 is perspective view of a louver used as part of active integrated ducting, according to the present invention.
Figure 6:
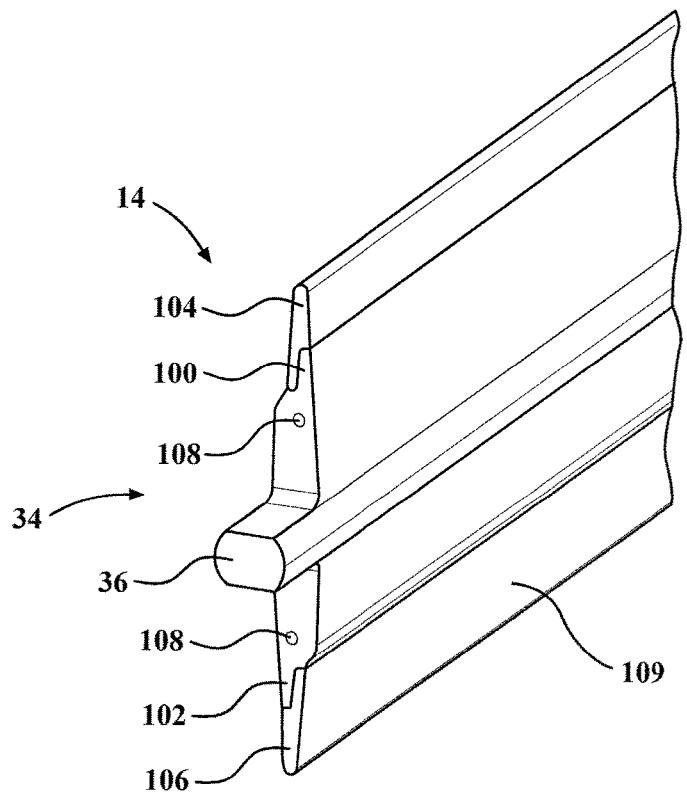
FIG. 6 is an enlarged perspective view of an end of a louver used as part of active integrated ducting, according to the present invention.
Figure 7A:
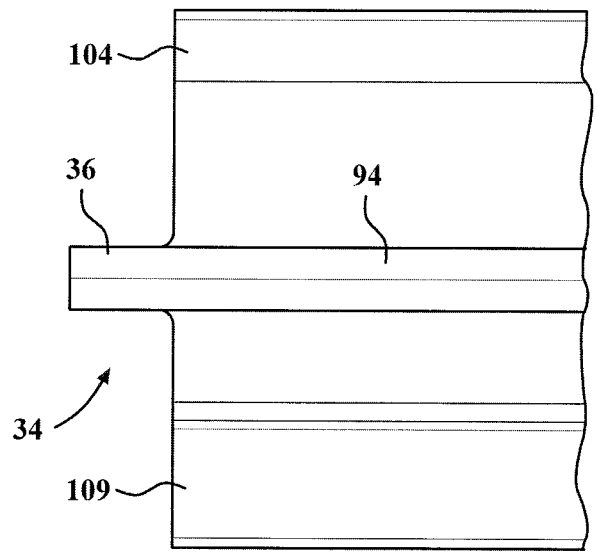
FIG. 7A is a side view of an end of a louver used as part of active integrated ducting, according to the present invention.
Figure 7B:
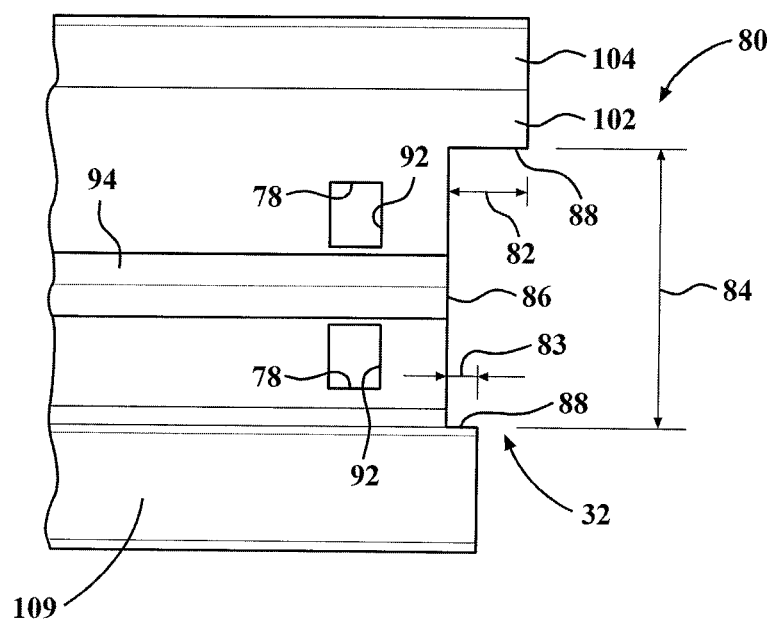
FIG. 7B is a side view of another end of a louver used as part of active integrated ducting, according to the present invention.
Figure 7C:
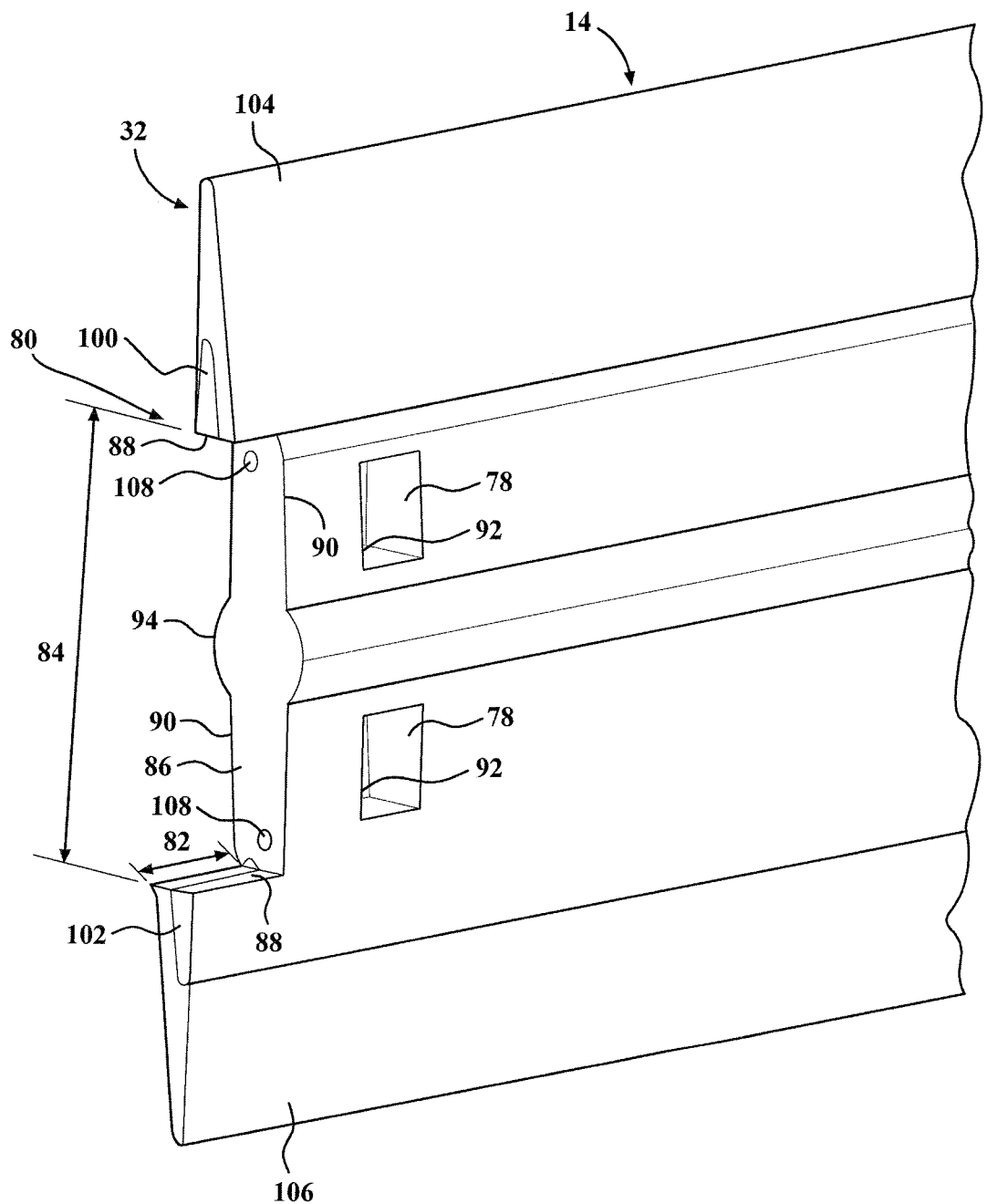
FIG. 7C is a perspective view of the end of the louver shown in FIG. 7B, according to the present invention.
Figure 8B:
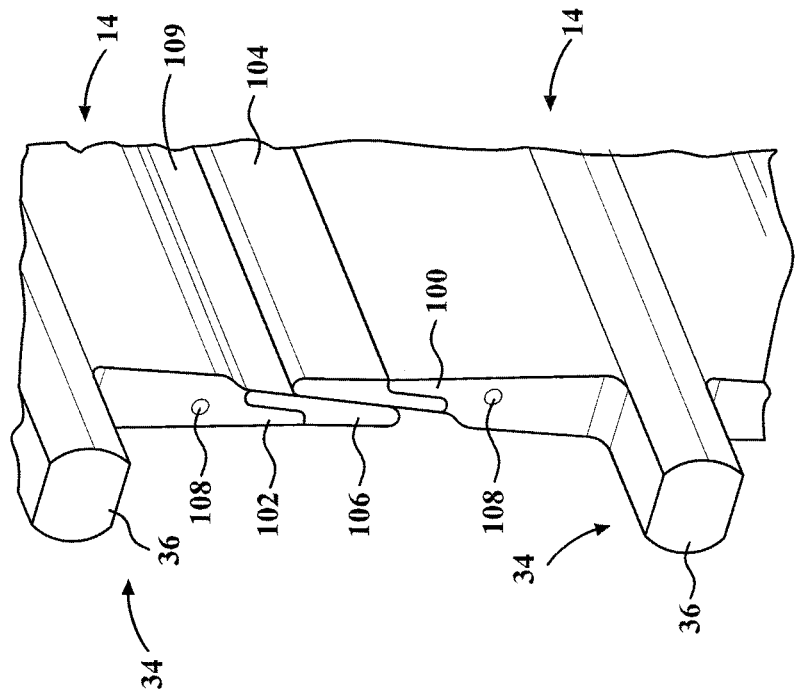
FIG. 8B is an enlarged perspective view of the louvers used as part of active integrated ducting in a closed position shown in FIG. 8A, according to the present invention.
Figure 8A:
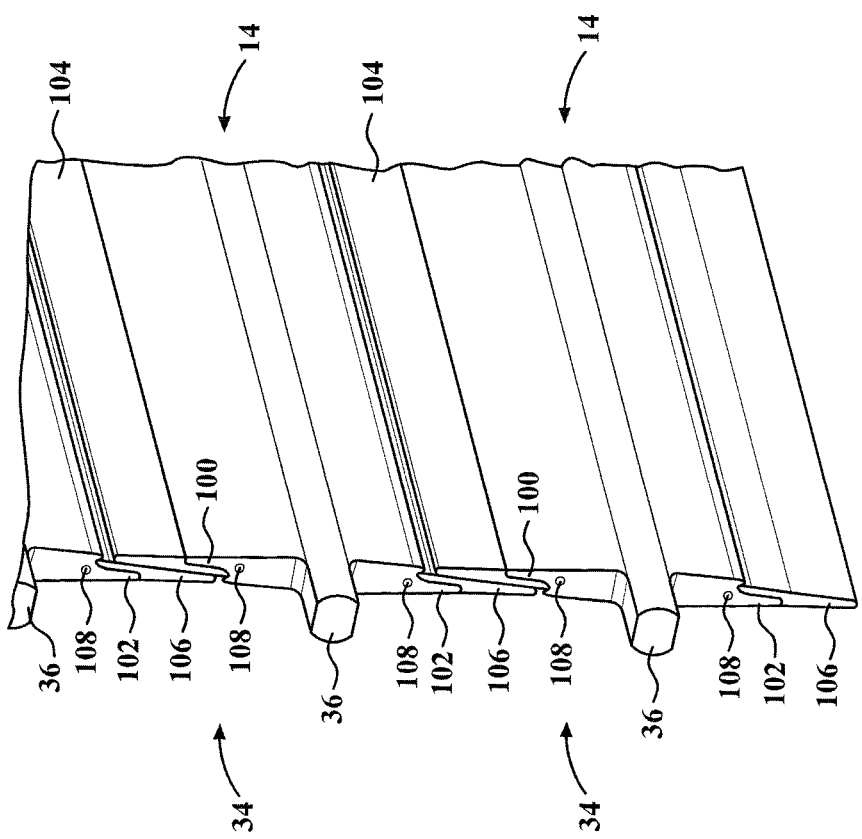
FIG. 8A is a perspective view of several louvers used as part of active integrated ducting in a closed position, according to the present invention.
Figure 8C:
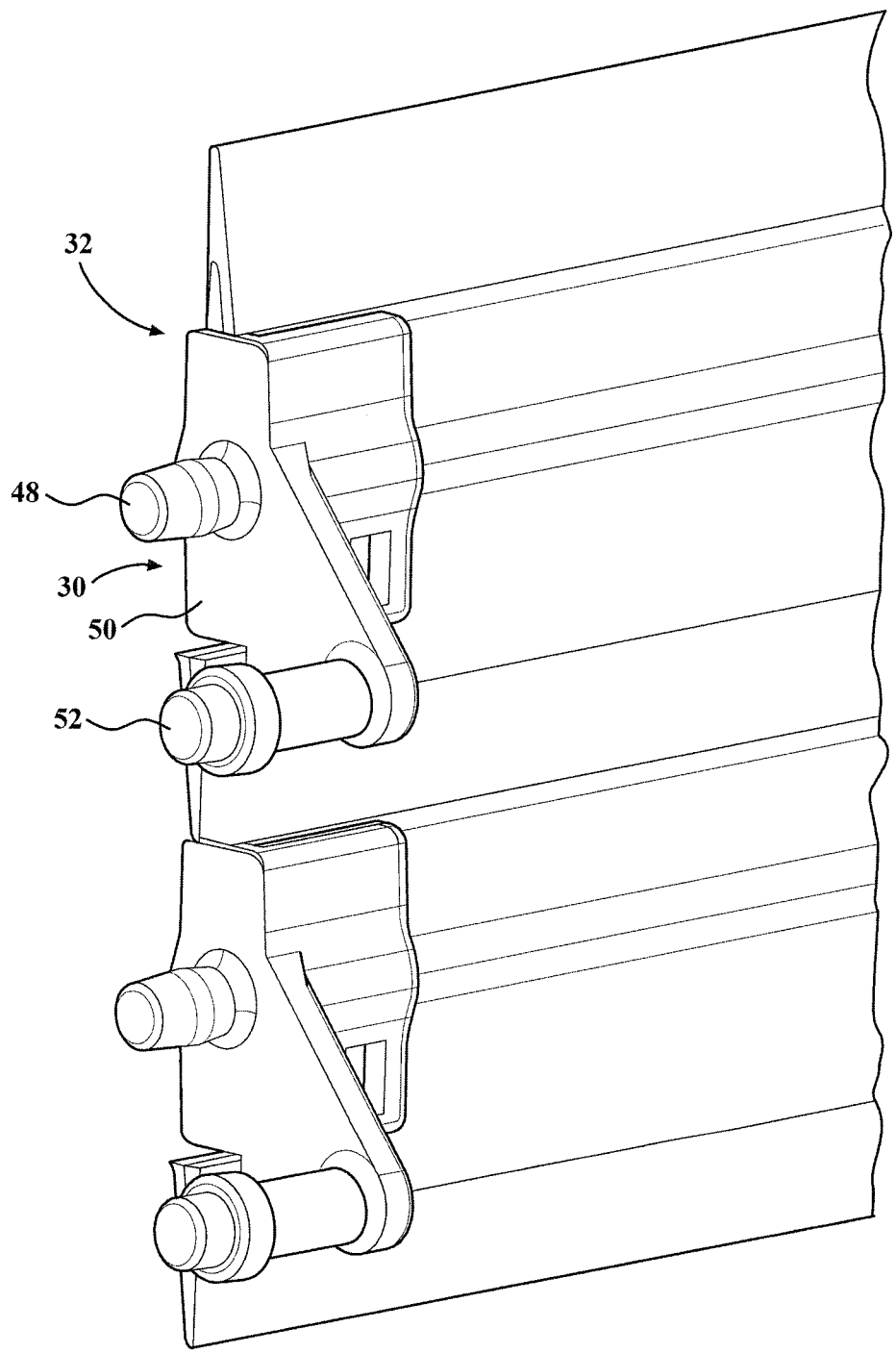
FIG. 8C is an enlarged perspective view of connecting portions attached to a set of louvers used as part of active integrated ducting in a closed position, according to the present invention.
Figure 13:
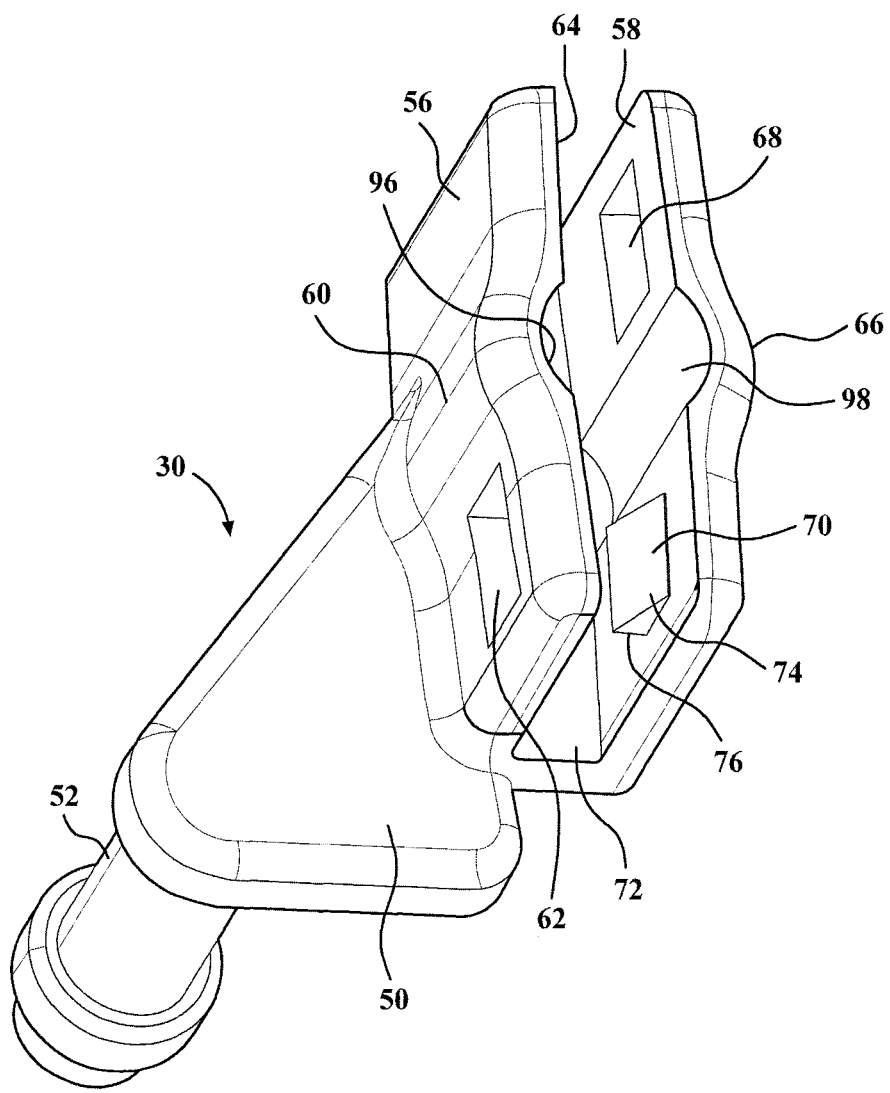
FIG. 13 is a third perspective view of a connecting portion operable for attachment to a louver used as part of active integrated ducting, according to the present invention.
Figure 14B:
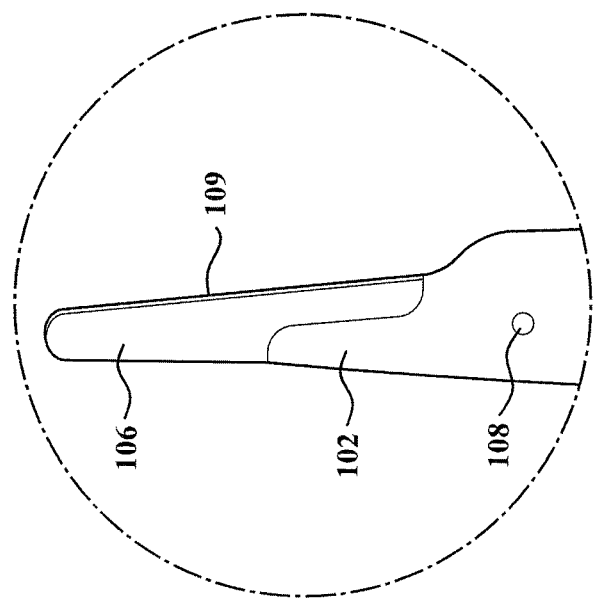
FIG. 14B is an enlarged view of the circled portion shown in FIG. 14A.
Figure 14A:
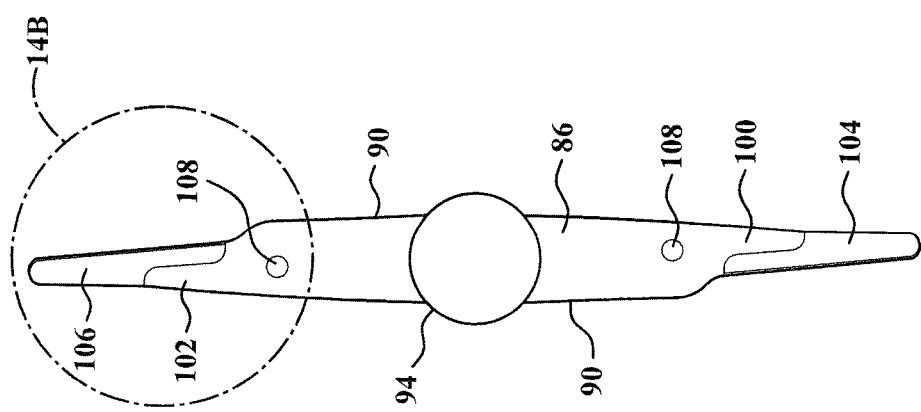
FIG. 14A is a sectional side view taken along lines 14A-14A of FIG. 5.

The apertures 12 are broken up into two groups, upper apertures, generally shown at 16, and lower apertures, generally shown at 18. Dividing the upper apertures 16 is a mounting portion in the form of an upper vertical mount 20, and dividing the lower apertures 18 is another mounting portion in the form of a lower vertical mount 22. Connected to the lower vertical mount 22 is an actuator 24; there is also a linkage system, generally shown at 26, which is connected to both vertical mounts 20,22. The linkage system 26 includes a link mechanism 28 operable for movement controlled by the actuator 24. The link mechanism 28 is pivotally connected to a connection surface on at least one end of the louvers 14. In this embodiment, the connection surface is a first end 32 of the louver 14. A group of connecting portions 30 is connected to the louvers 14 on the first end 32. The connecting portions 30 and louvers 14 mounted in the lower apertures 18 are substantially the same as the connecting portions 30 and louvers 14 mounted in the upper apertures 16. The connecting portions 30 are each rotatably connected to the mounts 20,22 as shown in FIGS. 3 and 4. The louvers 14 are also rotatably connected to the apertures 12 on a second end 34.

In one embodiment, shown in FIGS. 5-7A and 8A-8B, the second end 34 of each of the louvers 14 includes a pin 36 which extends into a recess 38 formed as part of an outer wall 40 of the upper apertures 16 and a recess 42 formed as part of an outer wall 44 of the lower apertures 18. Referring again to the Figures generally, the upper vertical mount 20 also includes a set of upper mounting apertures 46 used for receiving a pin 48 formed as part of each of the connecting portions 30. Each of the connecting portions 30 also includes a flange or body portion 50 having a drive pin 52 which is pivotally connected to the link mechanism 28. The lower vertical mount 22 includes a set of lower mounting apertures 54, which are also operable for receiving a respective pin 48 formed as part of each of the connecting portions 30.

Referring now to FIGS. 7B-7C, 8C, and 9-13, each of the connecting portions 30 has a first connecting plate 56 which is substantially parallel to a second connecting plate 58. The first connecting plate 56 has a first rounded portion 60, as well as a first square-shaped aperture 62 and a first locking apparatus 64. The second connecting plate 58 has a second rounded portion 66, a second square-shaped aperture 68, and a second locking apparatus 70. Each of the connecting plates 56,58 is connected to the body portion 50 such that a part of the body portion 50 forms a rear wall 72 adjacent each of the connecting plates 56,58.

Each locking apparatus 64,70 includes a contact surface 74 and a retention surface 76, and each locking apparatus 64,70 is operable for being selectively disposed in a corresponding square-shaped aperture 78 formed as part of the first end 32 of each of the louvers 14 when a connecting portion 30 is connected to the first end 32 of a louver 14. In this embodiment, there are two square-shaped apertures 78 formed as part of each louver 14, but it is within the scope of the invention that more or less apertures 78 may be used with more or less locking apparatuses 64,70.

The first end 32 of each louver 14 has a notch, generally shown at 80, with the notch 80 having a first depth 82, a second depth 83, and a desired height 84. Each notch 80 also includes a support surface 86 and side surfaces 88. To attach the connecting portion 30 to the first end 32 of a louver 14, each connecting portion 30 is positioned such that the louver 14 is disposed between the connecting plates 56,58 and a corner 90 of the support surface 86 contacts the contact surface 74 of a respective locking apparatus 64,70. A force is then applied to the connecting portion 30 to force the rear wall 72 toward the support surface 86. This in turn causes the contact surfaces 74 to move along the respective corners 90, and the connecting plates 56,58 to deflect, allowing the contact surfaces 74 to then move along the outer surface of the louver 14 until each locking apparatus 64,70 is in alignment with a respective aperture 78. At which point each locking apparatus 64,70 then moves into one of the apertures 78, the connecting plates 56,58 are no longer deflected, and return to their original positions. Once a locking apparatus 64,70 is located in an aperture 78, the retention surface 76 is then in contact with an inner surface 92 of an aperture 78, preventing the connecting portion 30 from becoming detached from the louver 14.

When it is desired to detach the connecting portion 30 from the louver 14, an object (such as a screwdriver, for example) is inserted through the first square-shaped aperture 62, the corresponding square-shaped aperture 78 formed as part of the louver 14 in alignment with the first square-shaped aperture 62, and pressed against the contact surface 74 of the second locking apparatus 70 to cause the second connecting plate 58 to deflect. Additionally, an object is also inserted through the second square-shaped aperture 68, through a corresponding square-shaped aperture 78 formed as part of the louver 14 in alignment with the second square-shaped aperture 68, and pressed against the contact surface 74 of the first locking apparatus 64, thereby causing the first connecting plate 56 to deflect. Once each of the connecting plates 56,58 deflects sufficiently, the locking apparatuses 64,70 are removed from the apertures 78, and the connecting portion 30 is able to be pulled away from the louver 14.

When the connecting portion 30 is connected to a louver 14, there is a rounded portion 94 formed as part of the louver 14 which is received into a first semi-circular recess 96 formed as part of the first rounded portion 60 and a second semi-circular recess 98 formed as part of the second rounded portion 66. This in combination with the connecting plates 56,58 ensures that the connecting portion 30 and louver 14 rotate together when connected to one another.

Each louver 14 has a first lip 100 and a second lip 102; the first lip 100 is connected to and used for supporting a first flap 104, and the second lip 102 is used for supporting a second flap 106. The flaps 104,106 are used for providing control of the airflow through the apertures 12. When the louvers 14 are in the closed position, the second flap 106 of one louver 14 is in contact with a first flap 104 of an adjacent louver 14, best seen in FIGS. 8A-8C.

Referring again to FIGS. 5-8C and 14A-14B, extending through each louver 14 is a pair of wires 108 which function to control the coefficient of linear thermal expansion (CLTE) of the louvers 14. Each wire 108 has an outer surface with a defined texture to provide a more secure connection between the wires 108 and the louver 14. The textured surface may be a ribbed, knurled, ridged, or any other type of surface suitable for providing a proper "grip" between the wires 108 and louvers 14 as they are coextruded.

The actuator 24 is operable to control the movement of the connecting portions 30 through the use of the link mechanism 28 being connected to each drive pin 52. The actuator 24 is operable to be actuated mechanically, hydraulically, electrically, through vacuum actuation, lost motion actuation, or by any other suitable method. The actuator 24 is controlled to move the connecting portions 30, which rotate the louvers 14 such that the louvers 14 are opened to a desired position. The louvers 14 are operable to be positioned between the fully open position to maximize the amount of airflow through the apertures 12, or to the fully closed position as shown in FIGS. 3 and 4, substantially reducing or eliminating air flow around the radiator, engine, and other components under the hood of a vehicle.

The actuator 24 is also operable to move the louvers 14 to positions between the fully open and fully closed positions as may be desired or selected, or required for optimum temperature control. The link mechanism 28, the connecting portions 30, and the louvers 14 are all connected such that they move substantially in unison. When looking at FIGS. 3 and 4, the louvers 14 are in the closed position. When the actuator 24 is actuated, the link mechanism 28 is moved upwardly, causing the drive pin 52 of each connecting portion 30 to rotate relative to the link mechanism 28, and each of the pins 48 disposed in the upper mounting apertures 46 and the lower mounting apertures 54 rotate as well. Similarly, each of the pins 36 located in the recesses 38,42 of the respective outer walls 40,44 rotate as well. Because the link mechanism 28 is a solid member, this in turn rotates all of the louvers 14 substantially in unison.

As the vehicle travels, and the louvers 14 are in at least a partially open position, air flow passes through the apertures 12 and removes heat from the various components located behind the carrier 10. In one particular embodiment, a radiator is disposed behind the carrier 10 such that when the louvers 14 are opened, air flow transfers heat away from the radiator, and the coolant flowing through the radiator is reduced in temperature.

If it is desired to reduce or substantially eliminate air flow around the various components of the engine (for the purpose of bringing the engine up to the desired temperature after a cold start), the actuator 24 is actuated to move the louvers 14 to the closed position, which then prevents air flow through the apertures 12.

In one embodiment, the louvers 14 shown in FIGS. 3-14B are formed using a coextrusion process. The louvers 14 are made of a type of thermoplastic material such as, but not limited to, polypropylene (PP). The wires 108 are made of a metal (such as aluminum or steel), and the flaps 104,106 are made of a Thermoplastic Vulcanizates (TPV), but it is within the scope of the invention that other types of Thermoplastic Elastomers (TPE) may be used. The louvers 14 may optionally include a slip coat 109 (shown in FIGS. 5-7B, 8A-8B, and 9-10). The slip coat 109 reduces the friction between the flaps 104,106, limits binding between the louvers 14 from ice formation on the surface of the flaps 104,106, and improves wear resistance to dirt and debris during cycling.

The louvers 14, wires 108, flaps 104,106, and slip coat 109 are coextruded together, and each louver 14 is then cut to the desired length to fit the carrier 10 shown in FIGS. 1-4. However, it is within the scope of the invention that the louvers 14 may be cut to any desired length to fit any carrier, or to fit into any size aperture different from the apertures 12. It is also within the scope of the invention that the louvers 14 may be used in other various locations which are part of a vehicle.

Part of the present invention includes the process for creating the louvers 14. One step in the process involves extruding a louver blank used to form the louvers 14, and another step in the process involves forming the ends 32,34 of the louvers 14. In one embodiment, the louver blank used to form the louvers 14 is extruded using a dual durometer. As the louvers 14 are extruded into a louver blank and cut, in one embodiment a stamping process may be used to form each end 32,34 of each louver 14 and cut the louvers 14 to the desired length simultaneously. This provides the advantage over cutting the louvers 14 to the desired length, and then stamping the ends 32,34 as a separate operation.

The notch 80 and the apertures 78 are formed in the first end 32 as the louver 14 is cut to the desired length, and the pin 36 is formed in the second end 34 as the louver 14 is cut to the desired length. Cutting the louver blank and stamping the ends 32,34 simultaneously reduces the steps in the manufacturing process, and also allows for greater flexibility in the applications in which the louvers 14 are used since they may be cut to any desired length. In an alternative embodiment, as the second end 34 is formed on one louver 14, the first end 32 may be formed on the subsequent louver 14 by using a single stamping die.

Additionally, because the louvers 14 are coextruded, the wires 108, flaps 104,106, and the slip coat 109 are formed as part of the louver 14 during the extrusion process, which eliminates the step of forming the flaps 104,106 and slip coat 109 as separate components and attaching the flaps 104,106 and slip coat 109 during separate manufacturing processes. Another advantage of coextruding the louvers 14 is that the louvers 14, wires 108, flaps 104,106, and slip coat 109 are all cut to the same length simultaneously, which eliminates attempting to cut the louver 14, flaps 104,106, and the slip coat 109 to the same length and then assemble them together (which would require a tolerance to account for the louver 14, flaps 104,106, and slip coat 126 not being cut to exactly the same length).

Shown in FIGS. 15A and 15B is another embodiment of louvers, shown generally at 110, which are operable with the carrier 10 to function as an integrated ducting system according to the present invention. The louvers 110 in this embodiment have a body portion 112 which is made of PP, but it is within the scope of the invention that other types of thermoplastics may be used. The body portion 112 includes a pair of hollow sections 114 and a central hollow section 116 to reduce the overall amount of material used. One of the hollow sections 114 is part of a first lip 118, and another of the hollow sections 114 is part of a second lip 120. Connected to the first lip 118 is a first or spring seal 122, and connected to the second lip 120 is a second or reaction seal 124. Each of the seals 122,124 are made of a TPV material in a similar manner as compared to the previous embodiment.

As with the previous embodiment, each of the seals 122,124 has a slip coat 126 which reduces the friction between the seals 122,124, limits binding between the louvers 110 from ice formation on the surface of the seals 122,124, and improves wear resistance to dirt and debris during cycling.

Also similar to the previous embodiment, there is a pair of wires 128 which function to control the coefficient of linear thermal expansion (CLTE) of the louvers 110. Each wire 128 also has an outer surface with a defined texture to provide a more secure connection between the wires 128 and the louver 110 similar to the previous embodiment.

The body portion 112 of each louver 110 is coextruded with the seals 122,124, the slip coat 126, and the wires 128. This allows all the components to be cut to any desired length, and may be used with the carrier 10, or integrated with other automotive parts to provide desired cooling. The ends of the louvers 110 shown in FIGS. 15A and 15B may be shaped similar to the ends 32,34 of the louvers 14 of the previous embodiment, and be connected to connecting portions 30 for allowing the louvers 110 to pivot relative to the carrier 10 substantially in unison.

In can be seen in FIGS. 15A and 15B that the seals 122,124 are not identical. The first seal 122 includes a recessed portion 130 which surrounds the end of the first lip 118 and also has a flexible portion 132. The slip coat 126 on the first seal 122 extends onto the flexible portion 132, and selectively contacts the slip coat 126 coextruded to the second seal 124. Essentially, the slip coat 126 coextruded to the second seal 124 functions at least in part as a contact surface or reaction surface to the flexible portion 132. The second seal 124 also has a recessed portion 134 which is connected to the end of the second lip 120; the recessed portion 134 is formed with an elongated portion 136, and the slip coat 126 coextruded with the second seal 124 covers the recessed portion 134 and the elongated portion 136.

As the actuator 24 operates to move the link mechanism 28, thereby rotating the louvers 110 substantially in unison, the slip coat 126 of both the first seal 122 and the second seal 124 contact each other when the louvers 110 are in the closed position. More specifically, the flexible portion 132 flexes and is positioned as shown in FIG. 15B when the louvers 110 are in the closed position and the first seal 122 is in contact with the second seal 124. The flexible portion 132 is shown in phantom depicts the position of the flexible portion 132 when the first seal 122 is not in contact with the second seal 124. The slip coat 126 along the elongated portion 136 of the second seal 124 contacts the slip coat 126 along the flexible portion 132 of the first seal 122 when the louvers 110 are in the closed position.

Figure 16B:
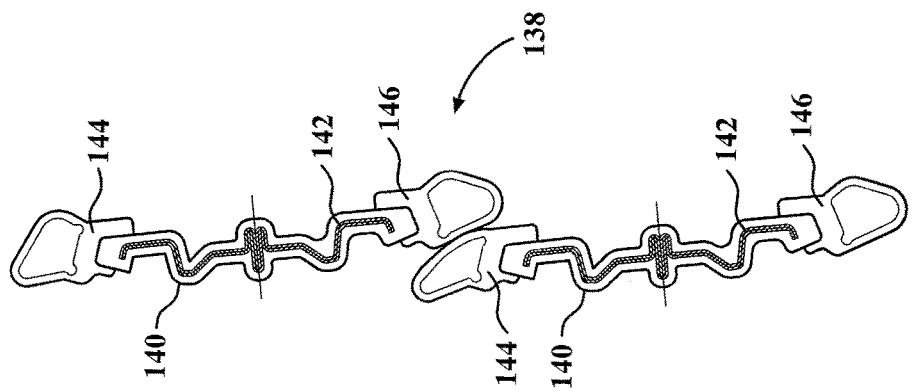
FIG. 16B is a sectional side view of the alternate embodiment of the louvers shown in FIG. 16A used as part of active integrated ducting, according to the present invention.
Figure 16A:
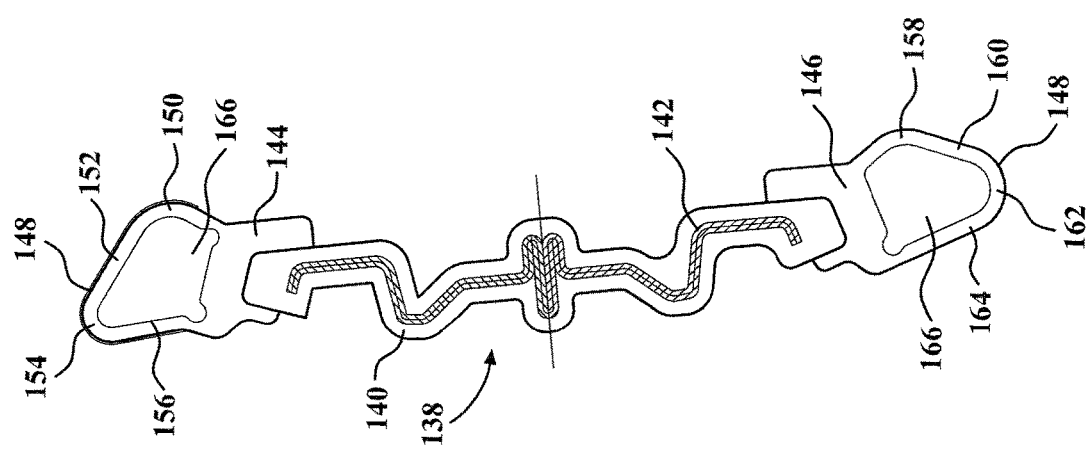
FIG. 16A is an enlarged view of another alternate embodiment of a louver used as part of active integrated ducting, according to the present invention.

Referring now to FIGS. 16A and 16B, louvers according to another embodiment of the preset invention are shown generally at 138. Similar to the previous embodiment, the louvers 138 each have a body portion 140 made of a thermoplastic material, such as PP. However, this embodiment also includes a support member or support spine 142 for providing increased strength. The support spine 142 is made of metal, such as but not limited to steel or aluminum, and in addition to providing strength, the support spine 142 also functions to control the CLTE of the louvers 138 (essentially performing the same function as the wires 108,128 of the previous embodiments).

The louvers 138 of this embodiment also have a first seal 144 and a second seal 146. The seals 144,146 are bulb-style seals, and are made of a TPV material, and each have a slip coat 148 for reducing friction and limiting binding between the louvers 138 when ice forms on the louvers 138, also improving the resistance to wear and debris during cycling.

The first seal 144 includes a first rounded segment 150, a first flat segment 152, a second rounded segment 154, and a second flat segment 156. The second flat segment 156 functions as a contact surface for a first rounded segment 158 of the second seal 146 mounted on an adjacent louver 138. The second seal 146 also includes a first flat segment 160, a second rounded segment 162, and a second flat segment 164. The various segments 150,152,154,156 of the first seal 144 and the various segments 158,160,162,164 of the second seal 146 are flexible, and deflect when the louvers 138 are in the closed position, and the first rounded segment 158 of the second seal 146 is pressed against the second flat segment 156 of the first seal 144. Each of the seals 144,146 include open sections 166 which help to reduce the amount of material used to produce the seals 144,146 and also increase the flexibility of the seals 144,146.

The louvers 138 of this embodiment are also suitable for mounting in the apertures 12, and may be cut to have ends similar to the first end 32 and second end 34 of the louvers 14 of the first embodiment. The louvers 138 of this embodiment may be cut to any length to be suited for use with any size aperture or location on a vehicle. Furthermore, because the body portion 140, the support spine 142, the seals 144,146, and the slip coat 148 are all coextruded together, the construction of the louvers 138 is simplified and more efficient.

Figure 17:
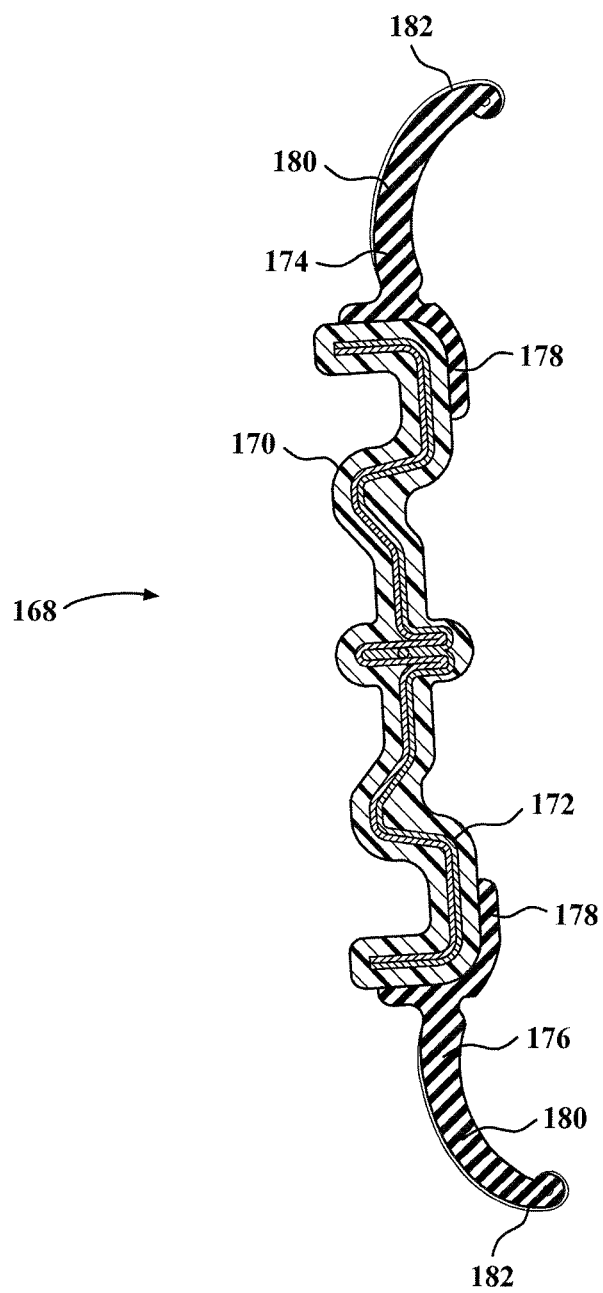
FIG. 17 is a sectional side view of yet another alternate embodiment of a louver used as part of active integrated ducting, according to the present invention.

Another embodiment of a louver for use with the carrier 10 to create integrated active ducting is shown in FIG. 17 generally at 168. The louver 168 of this embodiment also has a body portion 170 and a support spine 172. The body portion 170 and support spine 172 function in a similar manner to the previous embodiments, and are made of substantially the same materials, but the are shaped differently. The louvers 168 of this embodiment also include seals, but the seals of this embodiment are whisker-style seals. There is a first whisker-style seal 174 and a second whisker-style seal 176. Each of the seals 174,176 includes an arcuate portion 178 which is bonded to the body portion 170, and a flexible portion 180 integrally formed with the arcuate portion 178. There is a slip coat 182 connected to each of the flexible portions 180 of the seals 174,176 which functions in a similar manner to the slip coats 126,148 described in the previous embodiments to reduce friction between the louvers 168, limit the effect of ice formation on the surfaces of the seals 174,176, as well as improve wear resistance to dirt and debris.

When the louvers 168 of this embodiment are in operation, each louver 168 is rotated between an open position and a closed position. When in the closed position, the flexible portions 180 of the respective seals 174,176 contact one another and deflect to prevent air flow between the louvers 168. As with the previously described embodiments, the body portion 170, support spine 172, seals 174,176, and slip coat 182 are all coextruded simultaneously to reduce manufacturing time, and increase efficiency.

Figure 18:
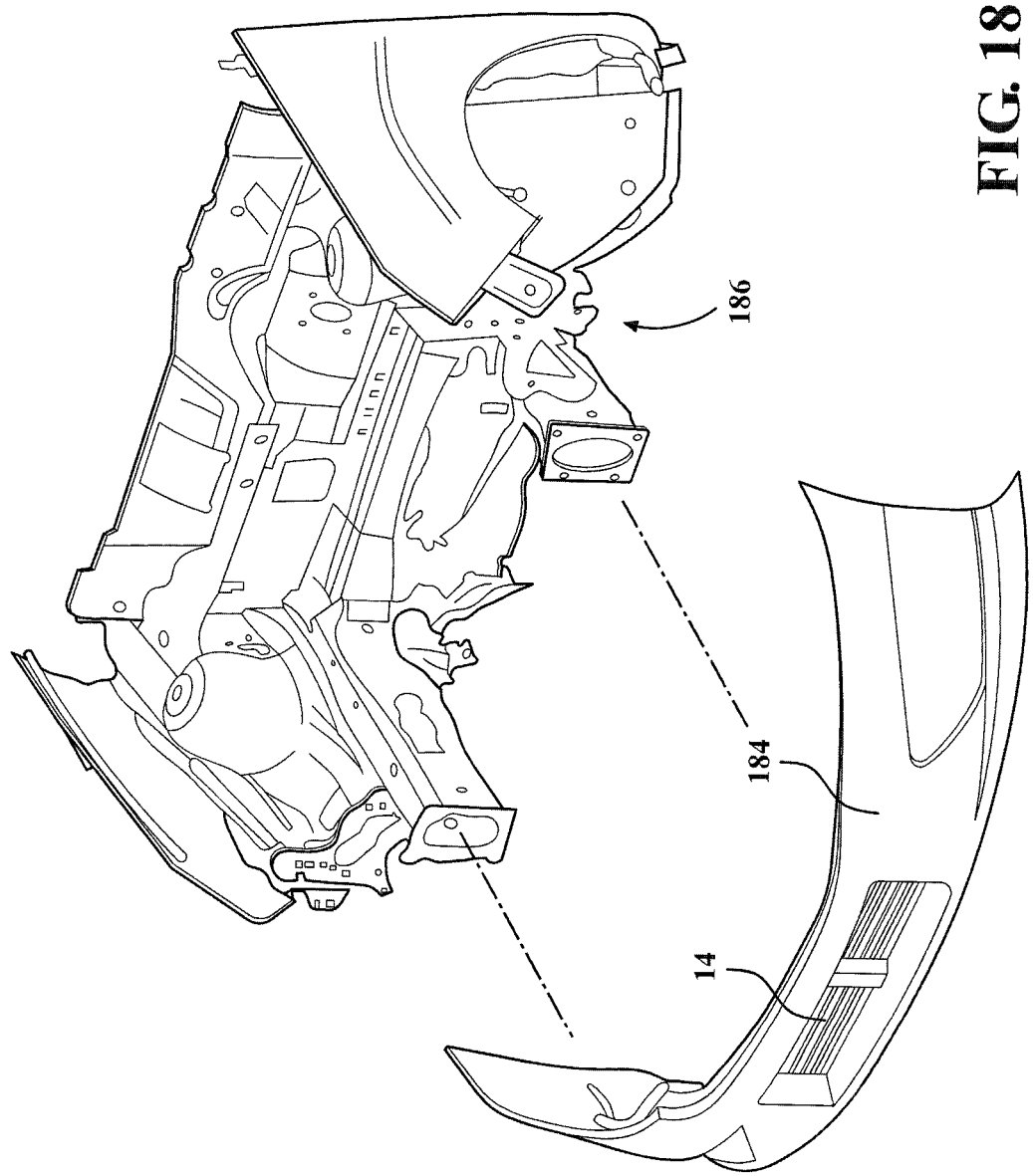
FIG. 18 is an exploded view of a fascia having active integrated ducting, with the fascia operable for connection with a vehicle support structure, according to the present invention.
Figure 19:
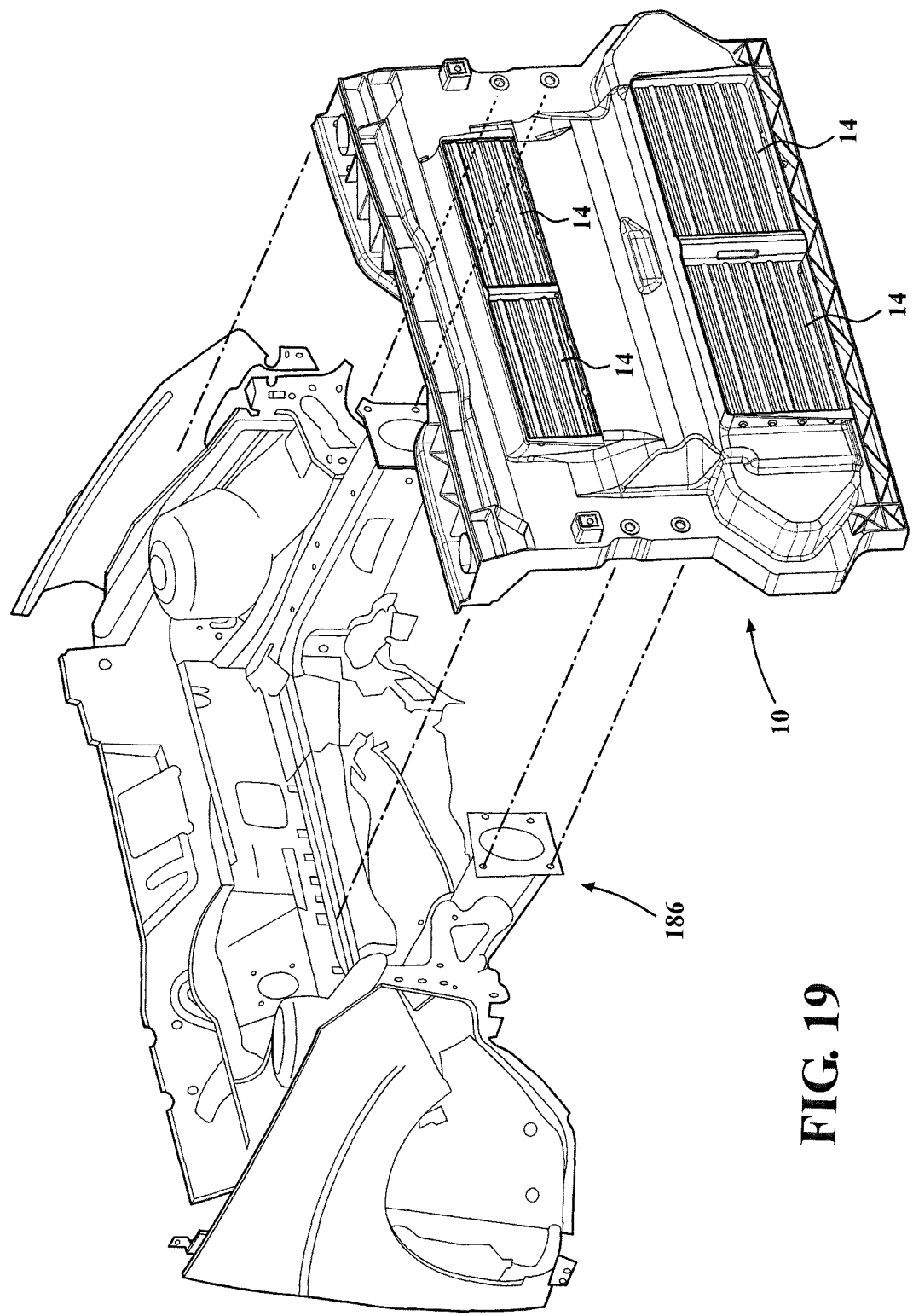
FIG. 19 is an exploded view of a carrier having active integrated ducting, with the carrier operable for connection with a vehicle support structure, according to the present invention.

It should be appreciated that all of the embodiments of the present invention provide the advantages of increased efficiency during manufacturing because of the use of coextrusion, and that the louvers 14,110,138,168 may be cut to any length to suit any size aperture for any vehicle. While the louvers 14,110,138,168 have been described for use with the carrier 10, the louvers 14,110,138,168 may be used with other vehicle components as well. An example of this is shown in FIG. 18, where the louvers 14 of the first embodiment have been incorporated for use with a fascia 184. The fascia 184 is connected to a vehicle support structure, such as a body-in-white (BIW) component or chassis. Referring to FIG. 19, the carrier 10 is shown as being connectable to the BIW structure 186. However, it is within the scope of the invention that any of the louvers 14,110,138,168 may be connected to any structure as may be necessary so as to control air flow around various vehicle components, such as components in the engine compartment of a vehicle, and therefore control cooling. The louvers 14,110,138,168 may be incorporated into components such as, but not limited to, fenders, the hood, fascia, bumpers, ground effects, and the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An integrated active ducting for a vehicle, comprising:
a carrier that is a single molded component having flanges and support members for connection with a vehicle chassis;
at least one aperture of the carrier;
at least one louver rotatably mounted in said at least one aperture, wherein the at least one louver has a post integrally formed at a first end that rotatably connects to the carrier and a second end of the at least one louver located at an end opposite the first end;
an actuator connected to said at least one louver, operable for moving said at least one louver between an open position and a closed position such that when said at least one louver is in said open position, air flow passes through said at least one aperture, and when said at least one louver is in said closed position, air flow is substantially prevented from moving through said at least one aperture;
a link mechanism that is driven by the actuator;
a body connected to the second end of the at least one louver, the body having a pivot pin that connects to the carrier and a drive pin that connects between the at least one louver and the link mechanism;
at least one connecting plate formed as part of said body;
at least one locking apparatus formed as part of said at least one connecting plate operable for providing a connection between said at least one connecting plate and the second end of the at least one louver such that as said link mechanism is moved by said actuator, said link mechanism applies a force to said drive pin, causing said body, said at least one connecting plate, and at least one louver to pivot;
at least one square-shaped aperture located in proximity to said second end of said at least one louver, said at least one square-shaped aperture operable for receiving a portion of said at least one locking apparatus, connecting said at least one connecting plate to said second end of said at least one louver;
a notch formed on said second end in proximity to said at least one square-shaped aperture, said at least one connecting plate is disposed in said notch when said at least one connecting plate is connected to said second end of said at least one louver; and
wherein the post formed on the first end of said at least one louver is received into a recess formed in an outer wall of said at least one aperture such that said at least one louver is rotatably mounted in said at least one aperture.

2. The integrated active ducting of claim 1, wherein the actuator moves said link mechanism such that said link mechanism repositions said at least one louver.

3. The integrated active ducting of claim 1, said at least one aperture further comprising a plurality of upper apertures and a plurality of lower apertures.

4. The integrated active ducting of claim 3, further comprising an upper vertical mount formed as part of said carrier and dividing at least two of said plurality of upper apertures.

5. The integrated active ducting of claim 4, further comprising a lower vertical mount formed as part of said carrier and dividing at least two of said plurality of lower apertures.

6. An integrated active ducting for a vehicle, comprising:
- a carrier that is a single molded component having flanges and support members for connection with an engine compartment of a vehicle;
- at least one upper aperture of the carrier located above at least one lower aperture of the carrier;
- at least one louver rotatably mounted in each of the at least one upper aperture and at least one lower aperture, wherein the at least one louver has a post integrally formed at a first end that rotatably connects to the carrier and a second end of the at least one louver located at an end opposite the first end;
- an actuator connected to all of the at least one louver, operable for moving said at least one louver between an open position and a closed position such that when said at least one louver is in said open position, air flow passes through said at least one aperture, and when said at least one louver is in said closed position, air flow is substantially prevented from moving through said at least one aperture;
- a link mechanism that is driven by the actuator;
- a body connected to the second end of the at least one louver, the body having a pivot pin that connects to the carrier and a drive pin that connects between the at least one louver and the link mechanism at least one connecting plate formed as part of said body;
- at least one locking apparatus formed as part of said at least one connecting plate operable for providing a connection between said at least one connecting plate and the second end of the at least one louver such that as said link mechanism is moved by said actuator, said link mechanism applies a force to said drive pin, causing said body, said at least one connecting plate, and at least one louver to pivot;
- at least one square-shaped aperture located in proximity to said second end, said at least one square-shaped aperture operable for receiving a portion of said at least one locking apparatus, connecting said at least one connecting plate to said second end of said at least one louver;
- a notch formed on said second end in proximity to said at least one square-shaped aperture, said at least one connecting plate is disposed in said notch when said at least one connecting plate is connected to said second end of said at least one louver; and
- wherein the post formed on the first end of said at least one louver is received into a recess formed in an outer wall of said at least one aperture such that said at least one louver is rotatably mounted in said at least one aperture.

7. The integrated active ducting of claim 6, wherein the actuator moves said link mechanism such that said link mechanism repositions said at least one louver.

8. The integrated active ducting of claim 6, further comprising an upper vertical mount dividing the at least one upper aperture.

9. The integrated active ducting of claim 6, further comprising a lower vertical mount dividing at least one lower aperture.

* * * * *